United States Patent [19]
Ochiai

[11] 3,752,537
[45] Aug. 14, 1973

[54] PRESSURE MODULATOR ASSEMBLY
[75] Inventor: Takeshi Ochiai, Aichi-ken, Japan
[73] Assignee: Toyota Jidosha Kogyo Kabushiki Kaisha
[22] Filed: Nov. 9, 1970
[21] Appl. No.: 87,782

[30] Foreign Application Priority Data
Nov. 8, 1969  Japan.............................. 44/89442
Jan. 29, 1970  Japan.............................. 45/8544

[52] U.S. Cl............................................ 303/21 F
[51] Int. Cl............................................. B60t 8/12
[58] Field of Search................................ 303/21 F

[56] References Cited
UNITED STATES PATENTS
3,260,556  7/1966  Packer.......................... 303/21 F
3,637,057  1/1972  Okamoto...................... 303/21 F

*Primary Examiner*—George E. A. Halvosa
*Attorney*—McGlew and Toren

[57] ABSTRACT

The assembly modulates the pressure of a working fluid, such as the brake fluid of an automotive vehicle, by the pressure of a control fluid, and includes an operating mechanism having a deflectable diaphragm, a working fluid pressure modulating mechanism operable by the diaphragm and including a pressure modulating piston controlling flow of working fluid through a working fluid line, and means biasing the diaphragm to a position in which the pressure modulating mechanism provides for substantially unrestricted flow to the working fluid line. A control fluid line is connected to the operating mechanism to apply, to the diaphragm, a control fluid pressure in opposition to the biasing means to operate the pressure modulating mechanism to restrict flow to the working fluid line. A throttle valve mechanism is included in the control fluid line to control the rate of control fluid relative to the operating mechanism, and the throttle valve mechanism is subjected to the pressure of the working fluid to vary the rate of flow of the control fluid as a function of the pressure of the working fluid. Application of the control fluid pressure is controlled by a valve operated by an anti-skid mechanism. The rate of flow of the control fluid may be varied as a direct function of the working fluid pressure, as an inverse function of the working fluid pressure, or as a combination of the direct and inverse functions of the working fluid pressure.

7 Claims, 7 Drawing Figures

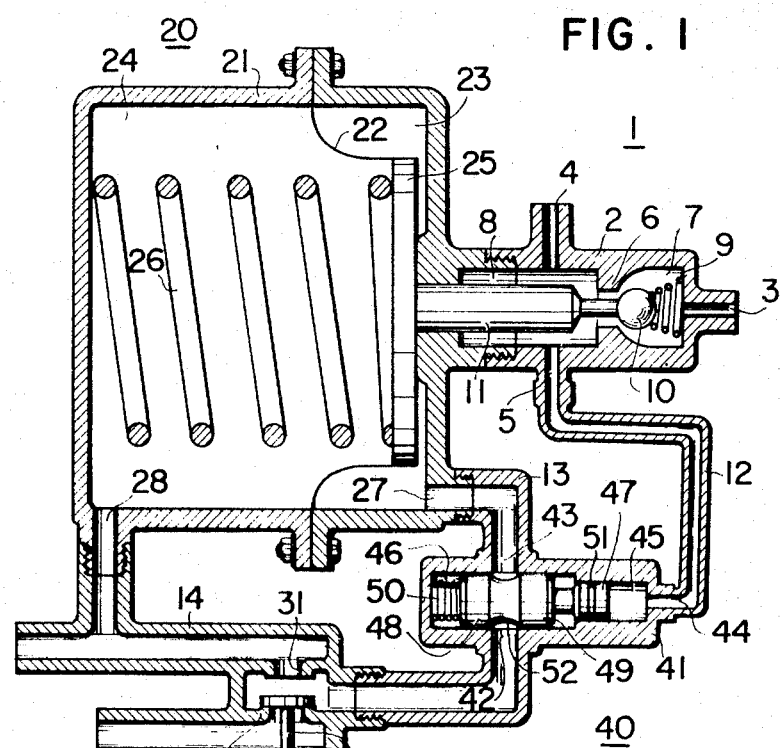
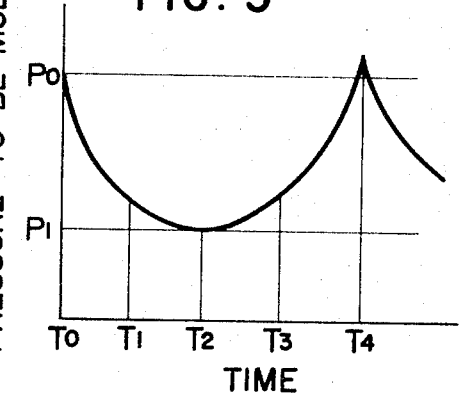
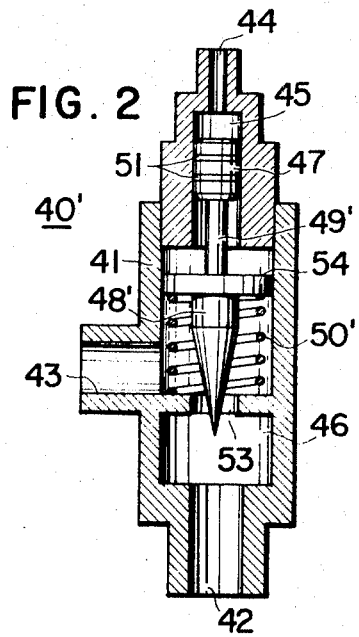
FIG. 1
FIG. 2
FIG. 3
INVENTOR.
TAKESHI OCHIAI

INVENTOR.
TAKESHI OCHIAI
BY McGlew and Toren
ATTORNEYS

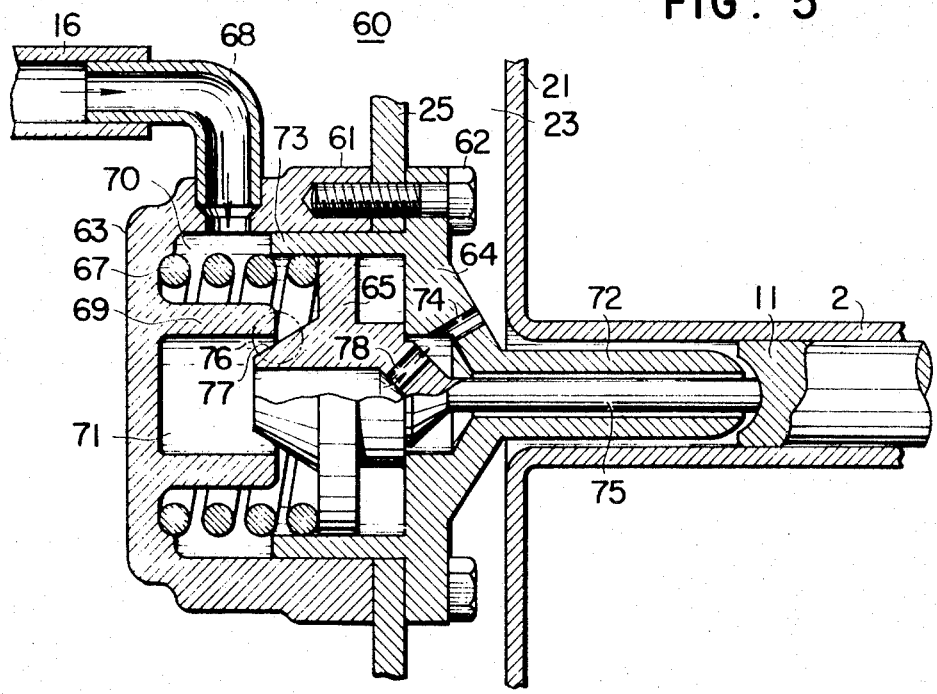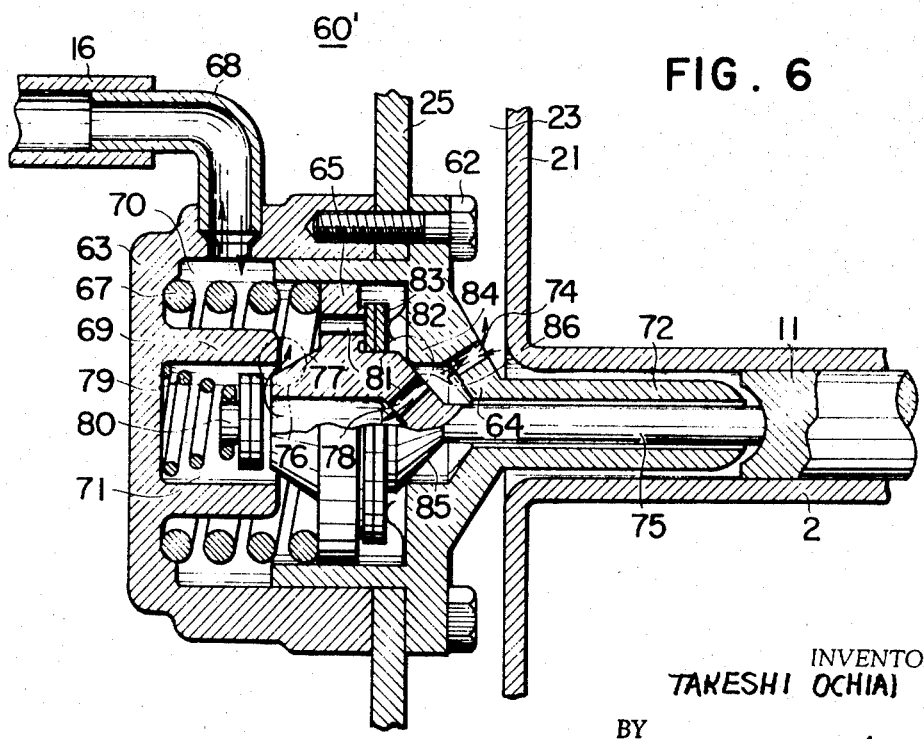

PRESSURE MODULATOR ASSEMBLY

SUMMARY OF THE INVENTION

This invention relates to a pressure modulator assembly in which the pressure of a working fluid is modulated by a control fluid. More particularly, it relates to a pressure modulator assembly for automobile use which is suitable for adjusting the fluid pressure of the wheel brake cylinder at a desired change rate by means of a control fluid pressure produced by an anti-skid system.

Since this kind of pressure modulator assembly is capable of bringing a vehicle to rest safely in the minimum stopping distance by preventing sliding between the road and the wheel at the time of hard application of the brakes, i.e., the so-called skidding, the assembly can regulate the fluid pressure of the wheel cylinder depending on the output of the anti-skid system, regardless of the amount of physical effort applied to the pedal.

Conventional pressure modulator assemblies comprise a pressure modulating mechanism having a pressure modulating piston which controls flow in the line between the master cylinder and the wheel cylinder, for the working fluid to be modulated for braking, and regulates the volume at the wheel cylinder side at the time of shut-off, an operating mechanism with a diaphragm which moves the pressure modulating piston by the action of the pressure of the control fluid such as air, produced by the anti-skid system, and a change-over valve mechanism with an electromagnetic valve which admits or discharges the control fluid depending on the output from the antiskid system. However, in such pressure modulator assemblies, the cross sectional area of the line for admitting the control fluid is fixed, and therefore the flow or discharge speed of the control fluid and the moving speeds of the diaphragm and pressure modulating piston also become fixed, resulting in a pressure change, of the working fluid to be modulated, at a fixed rate. Consequently, conventional assemblies leave much when desired to be used as the end unit of the anti-skid system.

The object of this invention is to provide a pressure modulator assembly having an optimum characteristic wherein the change rate of the pressure of the working fluid to be modulated is changed by the control fluid depending on the magnitude of the pressure of the fluid to be modulated.

In order to attain the above-described object, this invention provides, in a pressure modulator assembly in which a control fluid pressure is applied to a diaphragm of an operating mechanism to modulate a working fluid pressure by moving a pressure modulating piston of a pressure modulating mechanism, a line for the control fluid provided with a throttle valve mechanism comprising throttle valves, thus decreasing or increasing the fluid pressure to be modulated at higher or lower change rates in accordance with the working fluid pressure, i.e., decreasing the working fluid pressure at a higher change rate the higher the working fluid pressure is, in the case when the working fluid pressure is to be decreased and increasing the working fluid pressure at a lower change rate the higher the working fluid pressure is in case when the working fluid pressure is to be increased.

BRIEF DESCRIPTION OF THE DRAWINGS

In the drawings:

FIG. 1 is a cross-sectional view of an entire pressure modulator assembly in accordance with this invention;

FIG. 2 is a cross-sectional view of another embodiment of the throttle valve mechanism to be used in the assembly shown in FIG. 1;

FIG. 3 is the modulation characteristic diagram of the working fluid to be modulated according to said embodiment and which is represented by the relationship between the pressure and time;

FIGS. 4 to 7 illustrate a second embodiment of this invention; in which

FIG. 4 is a cross-sectional view of the entire assembly;

FIG. 5 is an enlarged detailed cross-sectional view of the throttle valve mechanism used in the assembly shown in FIG. 4;

FIG. 6 is an enlarged cross-sectional view of another embodiment of the throttle valve mechanism; and FIG. 7 is the modulation characteristic diagram of the working fluid to be modulated according to said embodiment and which is represented by the relationship between the pressure and time, the curve $a$ showing the characteristic obtained by utilizing the throttle valve mechanism shown in FIG. 5 and the curve $b$ showing that obtained by utilizing the throttle valve mechanism shown in FIG. 6.

DESCRIPTION OF PREFERRED EMBODIMENTS

Figure 4:
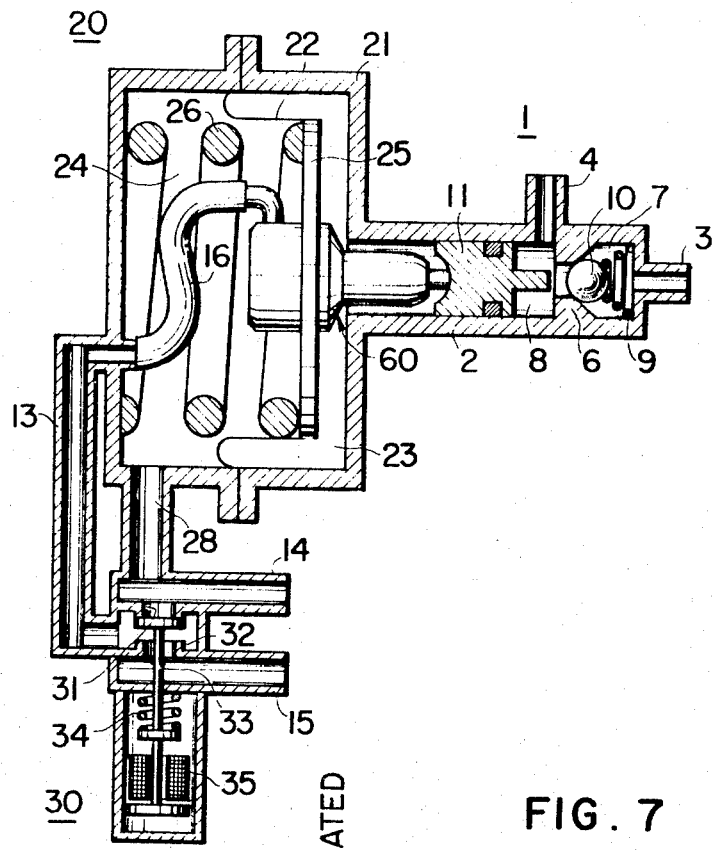

Referring now to FIG. 1, the pressure modulator assembly according to this invention consists of a pressure modulating mechanism 1, which either opens or shuts off lines, of brake fluid to be modulated, between a master cylinder and a wheel cylinder, and, at the same time, regulates the oil pressure of the wheel cylinder, an operating mechanism 20, which operates pressure modulating mechanism 1, a change-over valve mechanism 30 which is operated by means of electric signals derived from an anti-skid system (not shown) to preferentially either admit or discharge atmospheric air or a control fluid to or from the operating mechanism 20, and a throttle valve mechanism 40 which is operated by the working fluid to be modulated to change the control fluid. The pressure modulating mechanism 1 is provided with a connection port 3 communicating with a cylinder 2 and a master cylinder (not shown), a connection port 4 communicating with a wheel cylinder (not shown) and a connection port 5 communicating with the throttle valve mechanism 40 through a line 12. Pressure modulating mechanism 1 is divided, by a portion 6 having a reduced diameter, into two chambers 7 and 8 having connection port 3 and connection ports 4 and 5 therein, respectively. The chamber 7 is provided with a check ball 10 biased by a spring 9 toward contact with portion 6 of reduced diameter. Chamber 8 is provided with a pressure modulating piston 11 which brings chambers 7 and 8 into communication or shuts them off, by moving the check ball 10, and increases or decreases the volume of the chamber 8 at the time of shut-off. The case 21 of the operating mechanism 20 is divided into two chambers 23 and 24 by means of a diaphragm 22. The pressure modulating piston 11 is integrally connected to a diaphragm seat 25 of the diaphragm 22 and a spring 26 engages the opposite side of the diaphragm. The chamber 23 at the operating side communicates with the throttle valve mechanism 40, as well as with the change-over valve mechanism 30, through a connection port 27 and a line 13. Chamber 24 communicates with a vacuum source (not shown) through a connection port 28 and a line 14. The change-over valve mechanism 30 brings the line 13 into communication with the line 14 leading to the vacuum source through a valve port 31, and also brings the line 13 into communication with a line 15 opening into the atmospheric air, through a valve port 32. A valve rod 33 of an electromagnetic valve is provided in the passage between these valve ports 31 and 32. The valve rod 33 of the electromagnetic valve extends outside the passage and is provided with a spring 34 acting always to close the lower valve port 32. Also provided is an electromagnetic coil 35 which is connected to the anti-skid system (not shown) and moves the valve rod 33 of the electromagnetic valve upon receiving electric signals from the anti-skid system.

In the throttle valve mechanism 40, with which this invention is chiefly concerned, connection ports 42 and 43, communicating with the line 13, and a connection port 44, communicating with the line 12, are provided in a cylinder 41. A small diameter bore 45 and a large diameter bore 46 are provided within cylinder 41. A throttle valve 49, consisting of a portion 47 of reduced diameter and a portion 48 of larger diameter, is slidable in bores 45 and 46 under the bias of a spring 50 engaging portion 48. An oil seal ring 51 embraces small diameter portion 47 of the throttle valve 49 in order to prevent the working fluid to be modulated, in the line 12, from leaking. An annular recess 52 is formed in large diameter portion 48. Thus, the throttle valve mechanism 40 compares the working fluid pressure to be modulated, in the pressure modulating mechanism 1, and the tension of the spring 50, and moves the throttle valve 49, as the result of which the opening area is changed by changing the relationship between recess 52 and the connection ports 42 and 43 connected to the line 13 for the control fluid. At this time, the higher the working fluid pressure to be modulated is, the greater the change rate of the working fluid pressure to be modulated should be by increasing the amount of the control working fluid to be supplied. On the contrary, if the working fluid pressure to be modulated is low, the change rate of the fluid pressure to be modulated should be reduced by decreasing the flow rate of the control fluid. Even if the working fluid pressure to be modulated is nearly zero, a small amount of control fluid should be passed so as not to fully close the opening.

Referring now to the pressure modulation characteristic shown in FIG. 3, the operation of the above-described first embodiment of the pressure modulator assembly according to this invention will be described.

Under the normal braking condition wherein the wheel is not likely to become locked, the anti-skid system does not emit any signal for decreasing the braking pressure, and therefore the change-over valve mechanism 30 opens the valve port 31 to connect the vacuum source to line 13. At this time, the throttle valve mechanism 40 is in the communicating condition regardless of the magnitude of the fluid pressure to be modulated. Consequently, the pressures in the chambers 23 and 24 of the operating mechanism 20 become equal to the control pressure and the spring 26 moves the pressure modulating piston 11 to the utmost right position, through the diaphragm seat 25, to push out the check ball 10, thus bringing the chambers 7 and 8 of the pressure modulating mechanism 1 into communication. As a result, the braking oil pressure of the master cylinder is transmitted to the wheel cylinder without change and the working fluid pressure remains unmodulated.

When the fluid pressure to be modulated, i.e., braking pressure of the wheel cylinder at the time of hard application of the brake, has been suddenly increased and the skidding condition is caused, the anti-skid system emits signals for decreasing the braking pressure and energizes the electromagnetic coil 35. Therefore, the valve port 31 in the change-over valve mechanism 30 is closed, but the valve port 32 is opened. Thus, in the operating mechanism 20, the atmospheric air as a control fluid is fed into the chamber 23 at the operating side through the line 13 and the diaphragm 22 is deflected, overcoming the bias of spring 26 by the pressure difference between chamber 23 and chamber 24. Thus, the pressure modulating piston 11 is moved to the left and the small diameter portion 6 of the pressure modulating mechanism 1 is closed by means of the check ball 10, resulting in complete shut-off of the flow of the working or brake fluid to be modulated between the master cylinder and the wheel cylinder. Since at the early stage of this operation the brake fluid pressure to be modulated is quite high, the brake or working fluid pressure applied to the small diameter bore 45 of the throttle valve mechanism 40 through the line 12 is high. Thus, the throttle valve 49 of the throttle valve mechanism 40 is moved to the left to fully open the flow area between recess 52 and the connection ports 42 and 43, thus increasing the flow of the atmospheric air control fluid, to be supplied into the chamber 23 at the operating side of the operating mechanism 20. Therefore, the speed of movement of the diaphragm 22 of the operating mechanism 20 and the pressure modulating piston 11 to the left becomes higher, in accordance with which the volume of the chamber 8 of the pressure modulating mechanism 1 is rapidly increased and the working fluid pressure to be modulated suddenly drops off from the point Po, as shown by the curve between $T_0$ and $T_1$ in FIG. 3. Thus, when the fluid pressure to be modulated has been decreased and the oil pressure applied to the throttle valve mechanism 40 has become lower, the throttle valve 49 of the throttle valve mechanism 40 is gradually moved to the right to decrease the opening area as well as the flow rate of the control fluid to be supplied into the operating mechanism 20. As a result, the rate of movement of pressure modulating piston 11 to the left is decreased and the working fluid pressure is gradually decreased depending on the increase in the volume of the chamber 8 as shown by the light curve between $T_1$ and $T_2$ in FIG. 3. When the oil pressure is decreased depending on the magnitude of the working fluid pressure to be modulated, the skidding condition is relieved. Thus, when the working fluid pressure drops down to $P_1$, the throttle valve 49 of mechanism 40 is moved to the utmost right position to minimize the opening area thereof, thereby securing the minimum moving speed of the pressure modulating piston 11 and maintaining the fluid pressure to be modulated at or in the vicinity of $P_1$.

As described above, when the skidding condition at the time of hard application of the brake is relieved, the anti-skid system stops issuing signals for decreasing the braking pressure to deenergize the electromagnetic coil 35 of the change-over valve mechanism 30, thus restoring the normal braking condition. Consequently, the chamber 23 at the operating side of the operating mechanism 20 will communicate with the vacuum source thereby to suck out the atmospheric air control fluid. At this time, the pressure modulating piston 11 is gradually moved to the right in the way just reverse to the above-mentioned, moves ball 10 to the right and finally opens the small diameter portion 6 of the pressure modulating mechanism 1, thus bringing the master cylinder into communication with the wheel cylinder. At the early stage of this operation, the throttle valve 49 of the throttle valve mechanism 40 decreases the opening area for the passage of the control fluid, thus reducing the amount of fluid to be sucked out. Therefore, the moving speed of the pressure modulating piston 11 to the right, due to the action of the diaphragm 22 of the operating mechanism 20, is low. Thus, the fluid pressure to be modulated, in accordance with the decrease in the volume of the chamber 8 of the pressure modulating mechanism 1, is gradually increased from $P_1$ as shown by the curve between $T_2$ and $T_3$ in FIG. 3. When the recovery of the fluid pressure to be modulated has been started as described above and the oil pressure applied to the small diameter bore 45 of the throttle valve mechanism 40 is increased, the throttle valve 49 of mechanism 40 is gradually moved to the left to increase the opening area thereof, thus increasing the flow rate of the control fluid to be sucked out from the chamber 23 at the operating side of the operating mechanism 20. Consequently, the moving speed of the pressure modulating piston 11 to the right is increased and the fluid pressure to be modulated is quickly increased as shown by the curve between $T_3$ and $T_4$ in FIG. 3.

It should be understood that the throttle valve mechanism used in the first embodiment of the pressure modulator assembly according to this invention is not limited to the one shown in FIG. 1, but it can be modified as shown in FIG. 2. In the same manner as described above, the throttle valve mechanism 40' shown in FIG. 2 has, at the cylinder 41 thereof, the connection ports 42 and 43, communicating with the line 13, and the connection port 44, communicating with the line 12. Within cylinder 41 the small diameter bore 45 and the large diameter bore 46 are provided. The large diameter bore 46 has an orifice. A solid throttle valve 49' consisting of the portion 47 having a reduced diameter and a conical valve body 48 is inserted in the cylinder, and oil seal rings 51 embraces portion 47. A spring 50' is provided between the piston 54 of the valve body 48 and the orifice 53 in order to hold the orifice 53 normally in opened condition. Thus, in this embodiment of the throttle valve mechanism 40', the throttle valve 49' is moved depending on the magnitude of the fluid pressure to be modulated in relation to the bias of the spring 50', in the same manner as described above. The opening area for the control fluid is changed depending on the degree of extension of valve body 48 into the orifice 53, thereby changing the fluid pressure to be modulated at different change rates.

So far, the first embodiment of the pressure modulator assembly according to this invention, wherein the modulation of the pressure of the working fluid to be modulated is accomplished by comparing it with the working fluid pressure itself to be modulated has been described. Referring now to FIGS. 4 through 7, other embodiments of the pressure modulator assembly, employing another method of modulation, will be described below.

Referring to FIG. 4, the pressure modulator assembly consists of the pressure modulating mechanism 1, operating mechanism 20 and change-over mechanism 30, which are all similar to those used in the first embodiment, and a throttle valve mechanism 60 which is quite different from the one described previously. The pressure modulating mechanism 1 has the connection ports 3 and 4 connecting the cylinder 2 with the master cylinder and wheel cylinder (not shown) and included in the line for the fluid to be modulated, the check ball 10 with the spring 9 at the back of the chamber 7 which is one of two chambers 7 and 8 divided by the portion 6 having a reduced diameter, and the pressure modulating piston 11 having a shortened length and tightly fitted into another chamber 8. The operating mechanism 20 is provided with the chambers 23 and 24 which are formed by dividing the case 21 by the diaphragm 22 having the diaphragm seal 25, the spring 26 engaging diaphragm 22, and the connection port 28 provided within the chamber 24 and communicating with the control fluid or vacuum source (not shown) through the line 14. The change-over valve mechanism 30 has essentially the same construction in the first embodiment described above. It comprises the valve port 31 for the line 14, the valve port 32 for the line 15, the valve rod 33 of the electromagnetic valve for changing over ports 31 and 32, the spring 34 and the electromagnetic coil 35 connected to the anti-skid system. In throttle valve mechanism 60, with which this invention is chiefly concerned, a case body 61 is directly mounted on the diaphragm seat 25 of the operating mechanism 20 and communicates with the line 13, provided between the change-over valve mechanism 30 and the case 21 of the operating mechanism 20, through a flexible tube 16.

Referring now to FIG. 5, throttle valve mechanism 60 will be described in detail. The throttle valve mechanism 60 consists of two case bodies 63 and 64 of the case 61 which clamp diaphragm seat 25 therebetween by means of bolts 62, a piston 65 inserted within case bodies 63 and 64, and a spring 67 biasing piston 65. The case body 63 has a connection port 68 connected to the flexible tube 16 and the inside thereof is divided into two chambers 70 and 71 by means of an annular portion 69 having a reduced diameter. Case body 64 is provided with a hollow cylindrical projection 72 at the end thereof, and projection 72 extends into the chamber 8 of the pressure modulating mechanism 1. Also, case body 64 is provided with a cylindrical part 73 telescoped within case body 63 and an opening 74 communicating with the chamber 23 at the operating side of the operating mechanism 10. The piston 65 is slidably fitted into the cylindrical part 73 of the case body 64 and has a connecting rod 75 at the tip thereof which is loosely fitted through the projection 72 of the case body 64 to come into contact with the pressure modulating piston 11. Provided at the back thereof is a taper 77 which extends into the small diameter annular part 69 of the case body 63 thereby to form a throttle valve 76. In addition, a through hole 78, communicating with the chamber 71 and the opening 74, is provided within piston 65. The spring 67 is provided at the back of the piston 65 in the chamber 70 of the case body 63 to hold the throttle valve 76 opened. Thus, the throttle valve mechanism 60 determines the opening area of the throttle valve 76 depending on the relation between the position of the pressure modulating piston 11, i.e., the piston 65, and the moving position of the diaphragm 22, i.e., the case body 61, and supplies the control fluid, admitted through the flexible tube 16, to the operating side of the diaphragm 22 through the through hole 78 and the opening 74. At this time, if the working fluid pressure to be modulated is high and the piston 65 is moved to the left by way of the pressure modulating piston 11, the opening area of the throttle valve 76 is decreased, thus reducing the flow rate of the control fluid as well as the change rate of the working fluid pressure to be modulated. If the fluid pressure to be modulated is low and the piston 65 is moved to the right by means of the spring 67, the opening area of the throttle valve 76 is increased, thus increasing the flow of the control fluid as well as the change rate of the working fluid pressure to be modulated.

Figure 7:
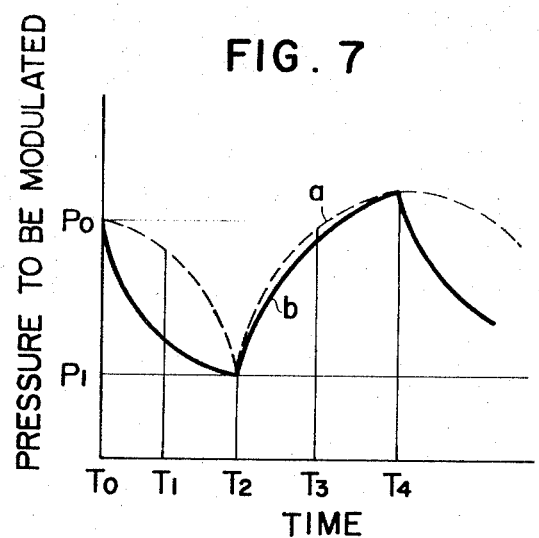

The operation of the above-described second embodiment of the pressure modulator assembly according to this invention will be described below with reference to the curve a of the pressure modulation characteristics shown in FIG. 7.

Under the normal braking condition wherein the wheel is not likely to become locked, the anti-skid system does not emit any signal for decreasing the braking pressure, and therefore the change-over valve mechanism 20 applies a vacuum to the chamber 24 of the operating mechanism 20, as well as to chamber 23 thereof through the throttle valve mechanism 60 in the same manner as described with the first embodiment. Consequently, the diaphragm 22 is moved to the utmost right position by means of the spring 26, thus bringing both chambers 7 and 8 of the pressure modulating mechanism 1 into communication by means of the pressure modulating piston 11 unseating ball 10. At this time, the working or brake fluid pressure remains unmodulated.

When the working fluid pressure, i.e., braking pressure of the wheel cylinder at the time of hard application of the brake, has been suddenly increased and the skidding condition is caused, the anti-skid system emits signals for decreasing the braking pressure. The change-over valve mechanism performs the changing over operation in the same manner as described above and the diaphragm 22 is deflected, by the control fluid (air at atmospheric pressure) supplied into the chamber 23 of the operating mechanism 20 through the throttle valve mechanism 60, thus shutting off flow of the brake fluid to be modulated in the pressure modulating mechanism 1 so that the brake fluid pressure is not increased any more. Since the brake fluid pressure is very high at the early stage, the pressure modulating piston 11 moves the piston 65 to the left in the throttle valve mechanism 60 in order to decrease the opening area of the throttle valve 76. Consequently, the flow rate of the control fluid supplied into the operating mechanism 20 is low and the moving speed of the pressure modulator piston 11 due to the deflection of the diaphragm 22 is also small. Therefore, the fluid pressure to be modulated gradually drops off from the point $P_0$ as shown by the curve between $T_0$ and $T_1$ in FIG. 7. When the pressure modulating piston 11 is caused to move to the left by the deflection of the diaphragm 22, the brake fluid pressure is decreased and the force for compressing the spring 67 of the throttle valve mechanism 60 is also decreased, resulting in the gradual increase in the opening area of the throttle valve 76. Consequently, the control fluid is supplied in a greater amount, the deflection rate of the diaphragm 22 is increased and the moving speed of the pressure modulating piston 11 is increased, thus resulting in the drop of the brake fluid pressure down to the point $P_1$ at a higher change rate as shown by the curve between $T_1$ and $T_2$ in FIG. 7.

As described above, when the skidding condition at the time of hard applicaton of the brake is relieved, the anti-skid system stops issuing signals for decreasing the braking pressure, and therefore the chamber 23 of the operating mechanism 20 will communicate with the vacuum source in the same manner as described with the first embodiment, thus sucking out the atmospheric air. Consequently, the pressure modulating piston 11 is gradually moved to the right and finally both chambers 7 and 8 of the pressure modulating mechanism 1 are brought into communication. However, the brake fluid pressure in the chamber 8 of the pressure modulating mechanism 1 is low at the early stage, and therefore the flow rate of the control fluid to be sucked out through the throttle valve 76 of the throttle valve mechanism 60 is high. Consequently, the moving speed of the pressure modulating piston 11, due to the deflection of the diaphragm 22, is increased and the fluid pressure to be modulated is quickly increased as shown by the curve between $T_2$ and $T_3$ in FIG. 7. When the pressure modulating piston 11 is further moved to the right and the brake fluid pressure is increased again, the opening area of the throttle valve 76 is gradually decreased. Therefore, the flow rate of the control fluid to be sucked out is decreased and the moving speed of the pressure modulating piston 11 is also decreased, resulting in the increase in the brake fluid pressure being modulated at a low change rate as shown by the curve between $T_3$ and $T_4$ in FIG. 7.

The above-described second embodiment of the pressure modulator assembly according to this invention is quite different from the first embodiment in that the fluid pressure to be modulated is decreased or increased at a change rate inversely proportional to the magnitude of said pressure. However, it is possible to obtain combined modulation characteristics of the brake fluid pressure. The throttle valve mechanism to be used for this purpose is described below with reference to FIG. 6.

Referring now to FIG. 6, the throttle valve mechanism 60' is constructed in nearly the same manner as described above. Mechanism 60' comprises the case body 63 which is mounted on the diaphragm seat 25 and is provided with the connection port 68, the small diameter annular or cylindrical part 69, the chambers 70 and 71 and the spring 67, the case body 64 which is mounted on the diaphragm seat 25 and is provided with the projection 72, the cylindrical part 73 and the opening 74, and the piston 65 having the connecting rod 75, the port 78 and the taper 77 forming the throttle valve 76. In addition, a check valve 80 biased by a spring 79 is provided in the chamber 71, so that said valve can be opened relative to the port 78 of the piston 65 at the time of suction of the control fluid only. A port 81 is provided in the piston 65 and another check valve 83, biased by a disk spring 82, is provided so that valve 83 can be opened at the time of supply of control fluid (at atmospheric pressure) only. Moreover, a circular valve seat 84 is formed in the case body 64 and a taper 85 is provided in front of the piston 65 thereby form another throttle valve 86. When the working or brake fluid pressure is to be decreased by supplying the control fluid under pressure, the throttle valve mechanism 60' opens the check valve 83 and increases the opening area of the throttle valve 86 if the fluid pressure to be modulated is high and the piston 65 is moved to the left. Consequently, the change rate of the working fluid pressure to be modulated is increased. If the working fluid pressure to be modulated is low, the change rate is decreased. When the working fluid pressure is to be increased by sucking out the control fluid, the check valve 80 is opened and the opening area of the throttle valve 76 is decreased if the fluid pressure to be modulated is high and the piston 65 is moved to the left. Consequently, the change rate of the working fluid pressure to be modulated is decreased. If the working fluid pressure to be modulated is low, the change rate is increased.

The operation of the pressure modulator assembly wherein the above-described throttle valve mechanism 60' is used will be described below with reference to the curve b of the pressure modulation characteristic shown in FIG. 7. When the skidding condition is caused and the control fluid under pressure is supplied, the throttle valve mechanism 60' increases the opening area at the first stage in order to admit a great amount of the control fluid into the operating mechanism 20, thus increasing the moving speed of the pressure modulating piston 11. Consequently, the working fluid pressure to be modulated is decreased from the point Po at a high change rate, as shown by the curve between $T_0$ and $T_1$ in FIG. 7, and is then decreased at a low change rate as shown by the curve between $T_1$ and $T_2$. When the skidding condition is relieved and the control fluid is sucked out, the throttle valve mechanism 60' increases the opening area at the first stage, because the working fluid pressure to be modulated is low. Therefore, a great amount of control fluid is sucked out and the moving speed of the pressure modulating piston 11 is increased. As a result, the working fluid pressure is increased at a high change rate, as shown by the curve between $T_2$ and $T_3$ in FIG. 7, and is then increased at a low change rate, as shown by the curve between $T_3$ and $T_4$.

This invention has been described with reference to the preferred embodiments. According to the pressure modulator assembly of this invention, the working fluid pressure to be modulated is modulated by the control fluid pressure at a high change rate conforming to the magnitude of the working fluid pressure, or at a low change rate inversely proportional to the working pressure, or is modulated at different change rates at the time of increase or decrease of the pressure fluid pressure to be modulated. Therefore, this pressure modulator assembly is quite effective in controlling the braking pressure with respect to the operation of the anti-skid system. Particularly in the case of the second embodiment, the throttle valve mechanism for modulation can be housed in the assembly, thus reducing the size of the assembly.

What is claimed is

1. A pressure modulator assembly, for modulating the pressure of a working fluid by the pressure of a control fluid, comprising, in combination, an operating mechanism including a casing and a deflectable diaphragm dividing said casing into two chambers; a working fluid pressure modulating mechanism operable by said diaphragm and including a pressure modulating piston controlling flow of working fluid through a working fluid line; means biasing said diaphragm to a position in which said pressure modulating mechanism provides for substantially unrestricted flow through the working fluid line; a control fluid line connected to said operating mechanism to apply, to said diaphragm, a control pressure in opposition to said biasing means to operate said pressure modulating mechanism to restrict flow through the working fluid line; a throttle valve mechanism in said control fluid line controlling the rate of flow of control fluid relative to said operating mechanism; and means connecting said working fluid line to said throttle valve mechanism and subjecting said throttle valve mechanism to the pressure of the working fluid to modulate continuously the rate of flow of the control fluid as a function of variation of the pressure of the working fluid.

2. A pressure modulator assembly, as claimed in claim 1, in which said throttle valve mechanism is positioned in said control fluid line exteriorly of said operating mechanism; said throttle valve mechanism including a throttle valve operated by the working fluid pressure in said pressure modulating mechanism and operable to change the flow area of said control fluid line to vary the working fluid pressure at a high rate, when the working fluid pressure is high, and at a low rate, when the working fluid pressure is low.

3. A pressure modulator assembly, as claimed in claim 2, in which said throttle valve comprises a cylinder and a piston reciprocable in said cylinder; said cylinder being formed with a pair of aligned ports included in said control fluid line; said piston being formed with an annular recess intermediate its ends and arranged to interconnect said ports; means engaging one end of said piston and biasing said piston to a position substantially interrupting communication between said ports; and means applying the working fluid pressure of said pressure modulating mechanism to the opposite end of said piston.

4. A pressure modulator assembly, as claimed in claim 2, in which said throttle valve comprises a cylinder formed with a pair of ports included in said control fluid line; a partition in said cylinder interposed between said ports and having a flow aperture therethrough; a piston reciprocable in said cylinder and having a tapered end extending into said aperture to control flow through said aperture; means biasing said piston to a position providing for substantially unrestricted flow through said aperture; and means applying the working fluid pressure of said pressure modulating mechanism to the opposite end of said piston.

5. A pressure modulator assembly, as claimed in claim 1, in which said throttle valve mechanism includes a case body directly mounted on said diaphragm; said control fluid line including a flexible conduit connected to and communicating with the interior of said case body; an operating piston reciprocable in said case body and including a first end extending into contact with said pressure modulating piston; said two chambers including a first chamber containing said biasing means and a second chamber on the opposite side of said diaphragm arranged to have the control fluid supplied thereto; means, including a part of said case body in said first chamber and the opposite end of said operating piston, forming a throttle valve included in said throttle valve mechanism; passage means in said piston and in said case body connecting said throttle valve to said second chamber; and second biasing means biasing said operating piston to a position providing for substantially unrestricted flow of control fluid through said throttle valve; said pressure modulating piston being subjected to the pressure of the working fluid in said pressure modulating mechanism to exert a pressure on said operating piston in opposition to said second biasing means; whereby the flow area of said throttle valve is decreased, to modulate the working fluid pressure at a low rate; when the working fluid pressure is high, and is increased, to modulate the working fluid pressure at a high rate, when the working fluid pressure is low.

6. A pressure modulator assembly, as claimed in claim 5, wherein said flow passage comprises a bore extending through said operating piston and communicating with a port in that portion of said case body located in said second chamber and opening into said second chamber.

7. A pressure modulator assembly, as claimed in claim 6, including a vacuum line communicating with said first chamber and selectively connectable to said control fluid line; a first check valve controlling flow through said bore in said operating piston, and opened only responsive to a vacuum in said control fluid line; a port opening through said operating piston independently of said bore in said operating piston; a second check valve controlling flow through said last-named port and opened only responsive to control fluid pressure in said control fluid line; and means, including said operating piston and said case body, defining a second throttle valve at the end of said operating piston opposite the end forming said first-mentioned throttle valve, said second throttle valve controlling communication between said second check valve and said second chamber and being opened responsive to movement of said operating piston, against the force of said second biasing means; by said pressure modulating piston; whereby, when the working fluid pressure is to be decreased, such decrease is effected at a rate which increases with the working fluid pressure, and, when said working fluid pressure is to be increased, said increase is effected by a rate inversely proportional to the working fluid pressure.

* * * * *